United States Patent [19]

Takayama

[11] Patent Number: 5,128,774
[45] Date of Patent: Jul. 7, 1992

[54] REPRODUCTION APPARATUS INCLUDING A PRESCANNER FOR PERFORMING PRESCANNING OF A RECORDING MEDIUM

[75] Inventor: Makoto Takayama, Yokohama, Japan

[73] Assignee: Canon Kabushiki Kaisha, Tokyo, Japan

[21] Appl. No.: 448,988

[22] Filed: Dec. 12, 1989

[30] Foreign Application Priority Data

Dec. 19, 1988 [JP] Japan ................. 63-320028

[51] Int. Cl.$^5$ ............................................. H04N 5/76
[52] U.S. Cl. ..................... 358/341; 358/185; 358/335; 358/342
[58] Field of Search ............... 358/341, 343, 185, 335, 358/342, 409; 360/72.1, 72.2, 14.1, 14.2, 9.1, 12

[56] References Cited

U.S. PATENT DOCUMENTS 3,632,867  1/1972  Markow .................. 358/409
4,644,423  2/1987  Buntsis et al. ............. 360/12

Primary Examiner—Robert L. Richardson
Attorney, Agent, or Firm—Fitzpatrick, Cella, Harper & Scinto

[57] ABSTRACT

A prescan system, and a reproducing apparatus having such a prescan system, which performs a prescan of a recording medium to determine whether auxiliary information (such as audio signal information, character information, code information or the like) is recorded thereon in association with video information. If such auxiliary information is present, the prescan is completed to permit appropriate read-out or other use of the auxiliary information. If no such information is detected, the prescan is terminated, to reduce unnecessary loss of time. Even if such auxiliary information is present, the prescan can be terminated by an instruction from an operator.

16 Claims, 6 Drawing Sheets

REPRODUCTION APPARATUS INCLUDING A PRESCANNER FOR PERFORMING PRESCANNING OF A RECORDING MEDIUM

BACKGROUND OF THE INVENTION

1. Field of the Invention

The present invention relates to a reproduction apparatus for carrying out reproduction from a recording medium capable of recording image information and additional auxiliary information associated in some way with the image information.

2. Related Art

Various recording media on which it is possible to record both audio and video information in association with each other are known, including, for example, the still video floppy disc, whose format was determined in the Still Video Conference (hereinafter termed simply "floppy" for convenience). In this format (floppy format), image signals are recorded, one circular track for each field, or two tracks for each frame, while the audio information is time-compressed and, increasing the frequency region of the audio signal within that of the image signal, the audio signal is recorded using the same system as for the image signal. In the case of the audio signal, one track has four sectors (#0-#3), and there are four types of methods of using those sectors. In type one, recording continues from a sector to the next sector in the same track. In type two, recording is ended in the track in question and picks up again in the first sector (#0) of the next track. In type three, the sequence of audio signals is terminated. In type four, a sector of that track remains unused, or sectors of that track are the remainder of sectors which are used as types one to three. As shown in FIG. 6, in each sector a start flag is provided before the time-compressed audio signal, and after the signal, an end flag. By means of the combination of start flag and end flag, it is possible to identify and thus to discriminate which of the four types is being used.

An audio signal sequence starts from a type one sector and is completed in a type three sector. FIG. 5 shows an example of four tracks in which one audio sequence is recorded, with each involved sector being shown.

In each sector is included a control code for the purpose of controlling the audio signal sequence. Table 1 shows the contents of the control code. By means of this control code, it is possible to reproduce a sequence of audio signals as continuous sound. Again, it is also possible to assign one still image to each track, and to reproduce the audio while the still image is being reproduced.

To reproduce an audio signal from the floppy, it is necessary to know the control code of the audio signal in advance. In order to effect the reproduction smoothly, it is also necessary to know for each track whether the track is empty, whether it contains an audio signal ("audio track"), whether it contains an image signal ("image signal track"), and, if it is an image signal track, whether it is a high-band or a low-band recording and whether it is a frame or a field, etc. For this purpose, in many conventional systems, upon inserting the floppy a prescan is carried out in which every track is checked and an indication of the contents of each track is stored, and then the system assumes a standby state for awaiting the operator's instructions.

TABLE 1

| Word | Data |
|------|------|
| W0 | Track number |
| W1 | Track number of initial audio signal of a signal sequence |
| W2 | Track number of next audio signal |
| W3 | Track number of corresponding image |
| W4 | (Reserved) |
| W5 | Time axis compression rate |
| W6 | Day |
| W7 | Month |
| W8 | Year |

However, such a prescan operation requires typically about twenty seconds and must be carried out, with the consequent cost in time, even if the floppy is one on which only image information is recorded.

SUMMARY OF THE INVENTION

Accordingly, it is an object of the present invention to provide a reproduction apparatus which is capable of selecting the prescan.

The above-mentioned object is attained, according to the present invention, by providing a reproduction apparatus having both means for performing a preliminary check of all blocks of data stored on a recording medium, in response to insertion of the recording medium into the apparatus, and also having means for terminating operation of the pre-check or prescan means before completion of the prescan. By virtue of this structure, it is possible to proceed immediately to the next action, when appropriate, without waiting for completion of the full prescan check, thus avoiding the inconveniently long time which in conventional apparatus must be allowed for the prescan.

Other objects, features and advantages of the present invention will be appreciated from the following detailed description of the preferred embodiments thereof, taken in conjunction with the accompanying drawings, wherein like reference characters refer to like elements.

DETAILED DESCRIPTION OF THE PREFERRED EMBODIMENT

The following detailed description is set forth in terms referring to a still video floppy, by way of example, but it is to be understood that the present invention is by no means limited to that form of memory, but can, for example, also be used with solid state memory, and in reproducing from such recording media having, for example, image data in each block and perhaps also auxiliary data corresponding to the image data.

Figure 1A:
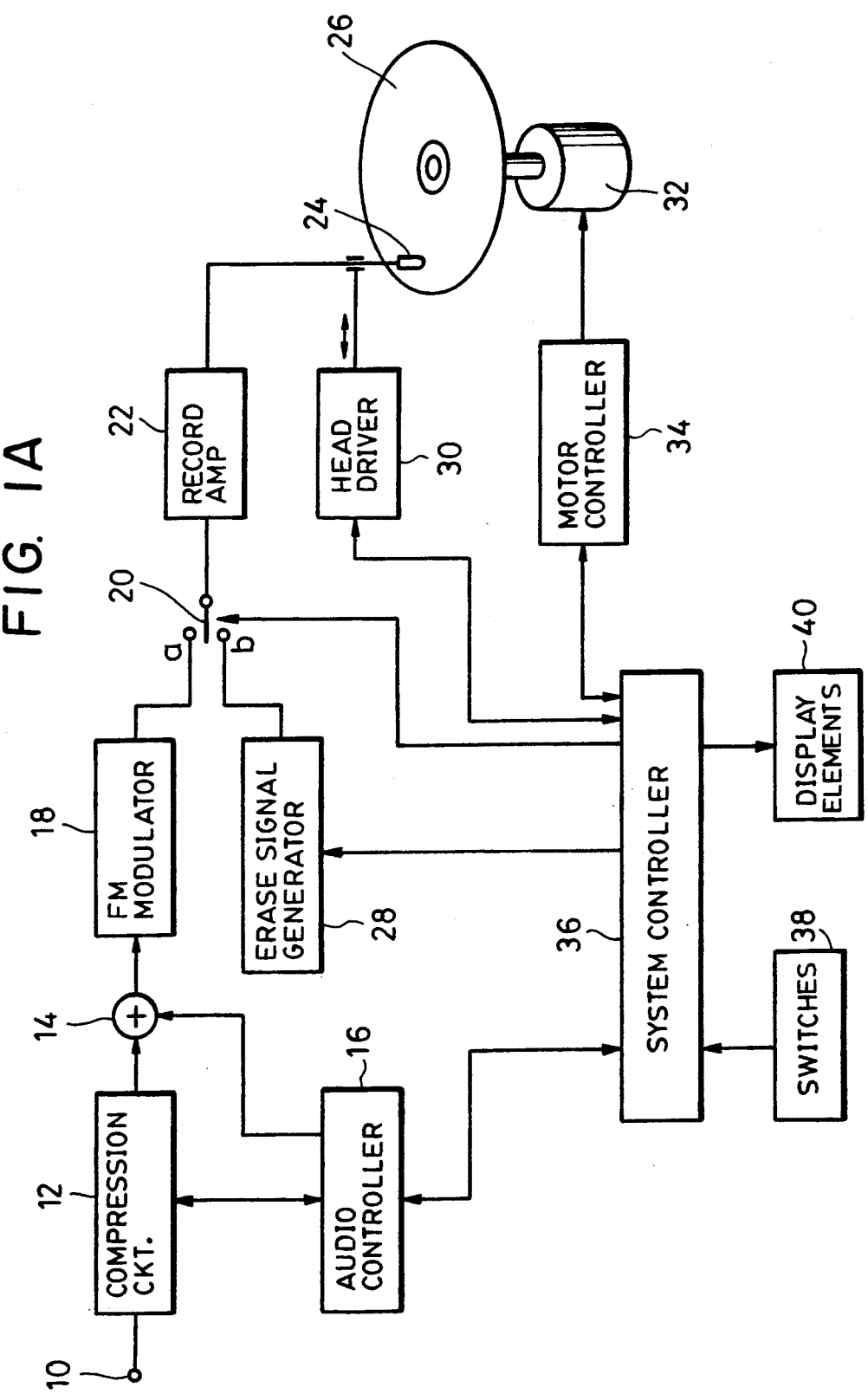
FIG. 1A is a block diagram showing a recording and erasing system of a first preferred embodiment of the present invention.
Figure 1B:
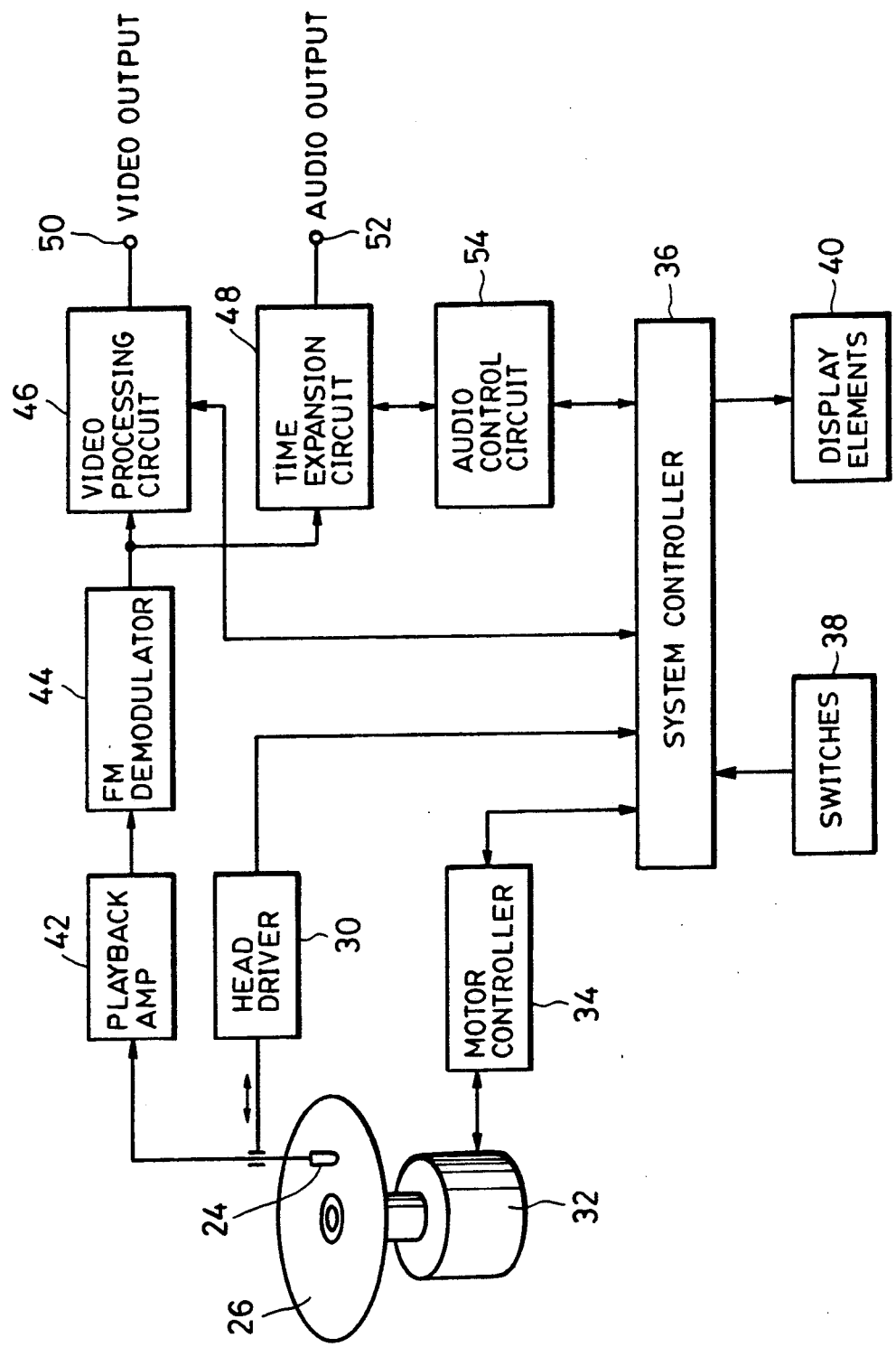
FIG. 1B is a block diagram showing a reproducing system of the first embodiment.

FIGS. 1A and 1B are respectively block diagrams of the structure of an audio signal recording and erasure system, and of an audio and video playback system in a still video recording and reproducing apparatus. In the circuit shown in FIG. 1A, an analog audio signal input by input terminal 10 is time-compressed by compression circuit 12 with a designated time axis compression rate under control of an audio control circuit 16, to convert the audio signal into the video band. Adder 14 adds a start flag, control code and end flag from audio control circuit 16. The output from adder 14 is FM modulated by FM modulator 18, and is then recorded on a magnetic disc 26 (a still video floppy) via a switch 20, a recording amp 22 and a magnetic head 24. For recording, the switch 20 is set in position a, while for erasure it is set at position b. An erasure signal generating circuit 28 is provided, as are a driving circuit 30 for controlling the radial movement of the magnetic head 26, a disc motor 32, a driving circuit 34 for a driving motor 32, a system controller 36 which provides general control for all the circuitry in FIG. 1A, where a memory for storing information as to whether recording on each track on the disc has been done and on forms of audio signals is included, and switches 38, including insertion-detecting, mode-instructing and any other types of switches.

In the circuit shown in FIG. 1B, the signal read out from the magnetic disc 26 by the magnetic head 24 is supplied via a playback amp 42 to an FM demodulator circuit 44. The signal, after demodulation by the FM demodulator circuit 44, is supplied to a video processing circuit 46 and a time expansion circuit 48, which reexpands the previously compressed signal. Video processing circuit 46 processes the video signal from the image track for playback, and outputs the resulting still video signals to an output terminal 50. The time expansion circuit 48 restores the signal from the audio track to its original form by means of time expansion, and outputs the reproduced audio signal to an output terminal 52. The time expansion circuit 48 is controlled by an audio control circuit 54. It should be noted that the circuit of FIG. 1B has a number of elements in common with that shown in FIG. 1A, which elements, being the same in function and arrangement in both (except as explicitly stated), are indicated by the same reference characters and are explained once only.

Figure 2:
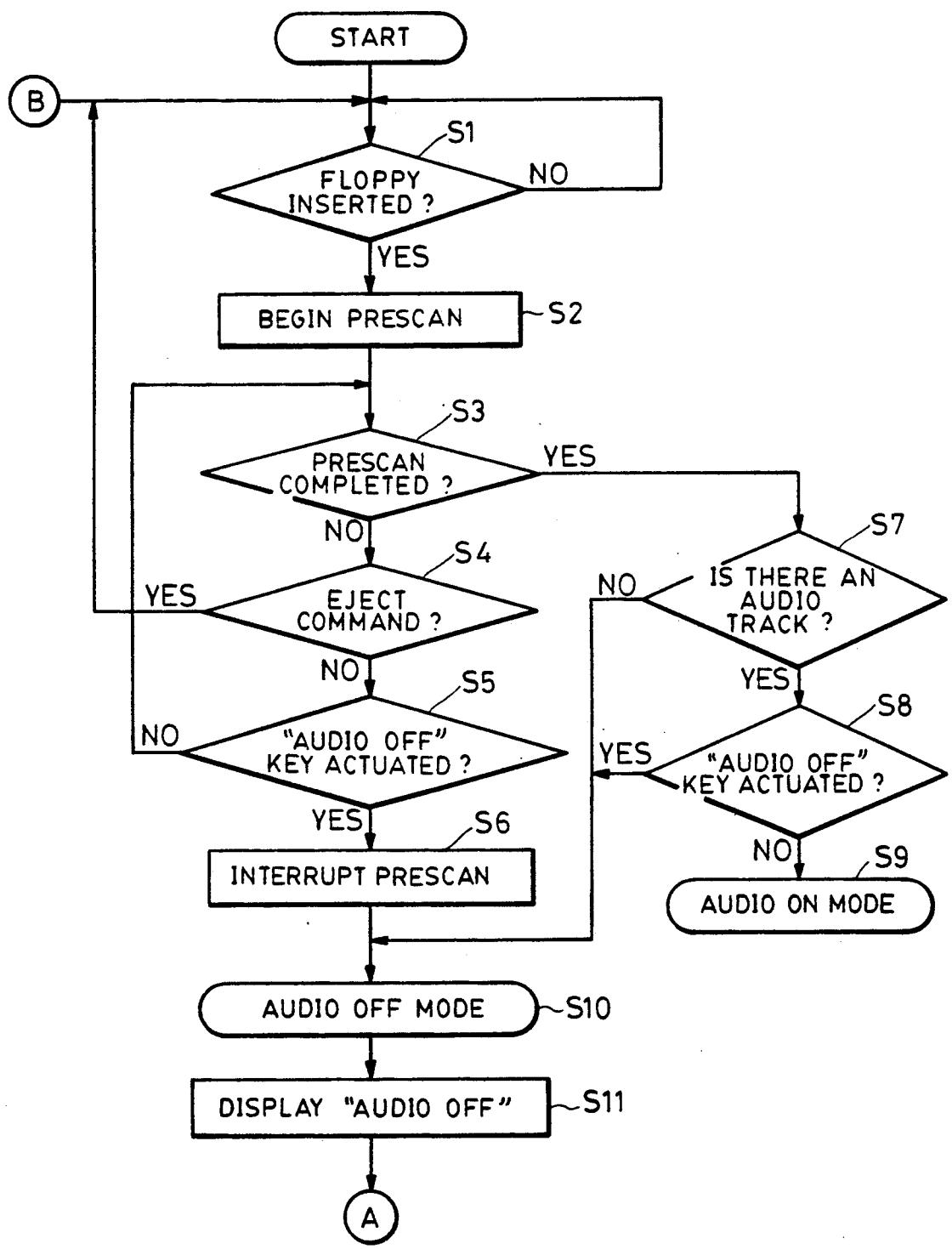
FIGS. 2 and 3 are together a flow chart showing the general operation of the embodiment of FIGS. 1A and 1B.
Figure 3:
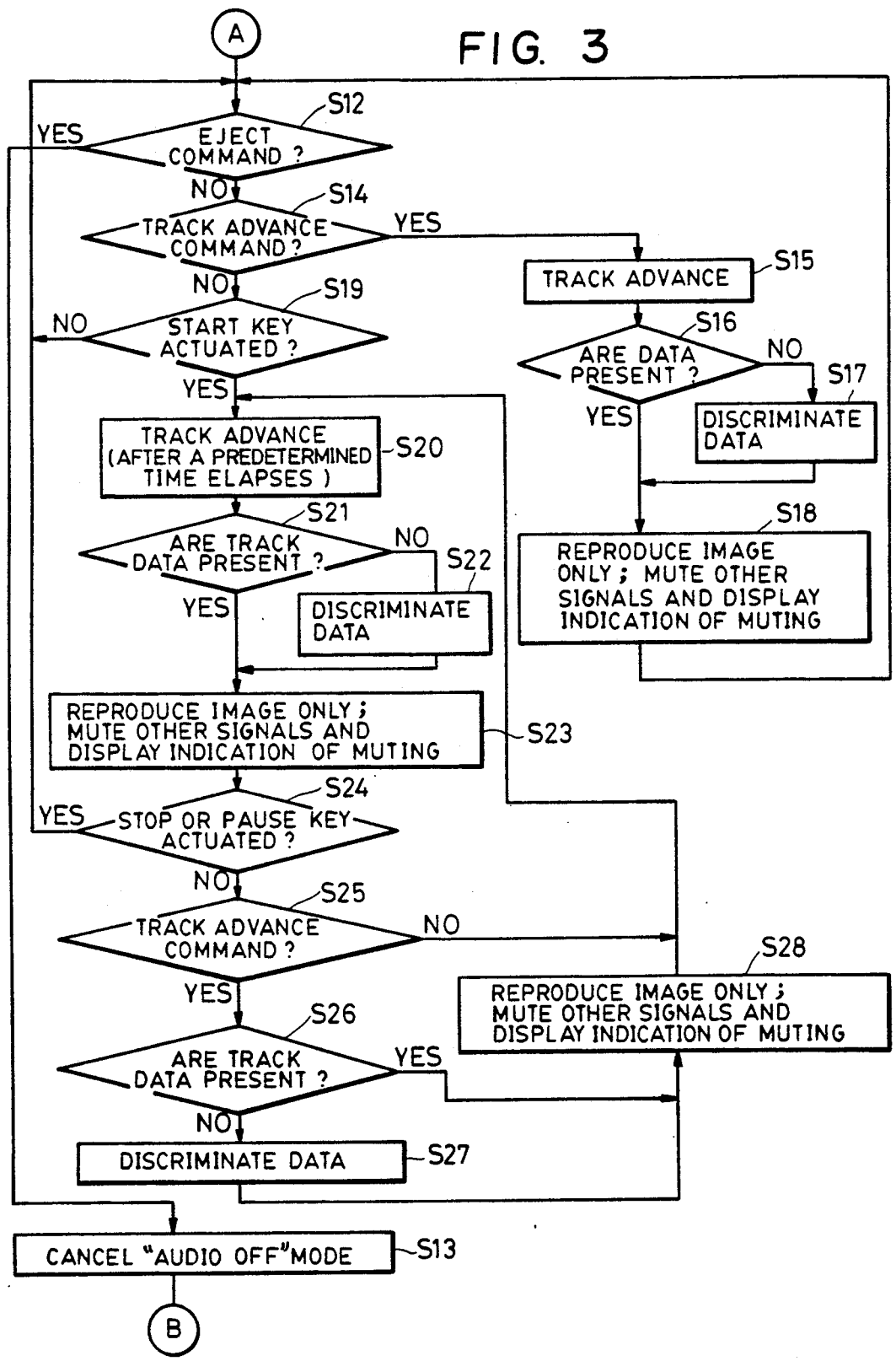

The operation of the systems of FIGS. 1A and 1B is illustrated in the flow chart in FIGS. 2 and 3. When it is detected in Step S1 that a floppy has been inserted into the apparatus, a prescan is begun in Step S2. In this prescan, the above-mentioned recording-content auxiliary information is checked for each track and stored. In Step S3 the system checks to determine whether the prescan has been completed. If not, it proceeds to Step S4, where it checks for whether an eject command has been input, instructing that the floppy be ejected from the apparatus. If no such command has been received, it proceeds to Step S5, in which it checks for whether an "audio off" command has been input via a key provided in this embodiment for that purpose. If the prescan is determined in Step S3 to have been completed, the system ascertains whether an audio track is present (Step S7) and, if one is present, also checks in Step S8 to determine whether an "audio off" command has been input. If no such command is detected in Step S8, the system assumes the audio-on mode (Step S9) and otherwise assumes the audio-off mode, and then proceeds in either case to Step S10. The audio-on mode, as used herein, is a mode for reproducing only an audio signal recorded on the disc, or reproducing an audio signal and a video signal simultaneously, while the audio-off mode is a mode for reproducing only a video signal without an audio signal.

Once the audio-off mode has been assumed in Step S10, a display "Audio Off" or the like is provided (Step S11) on the display unit 40.

As shown in FIG. 2, if an eject command is detected in Step S4, the flow returns to Step S1. If the audio off key has not been actuated as of the time when Step S5 is performed, the flow returns to Step S3. If an "audio off" command is detected in Step S5, the prescan is interrupted in Step S6, the audio-off mode is entered in Step S10 and "Audio Off" is again displayed in Step S11.

In the audio-off mode, once the "Audio Off" display has been established in Step S11, another check is made for whether an eject command has been input, in Step S12. If such a command is detected, the audio-off mode is cancelled, and the flow returns to Step S1. Otherwise, the flow advances to Step S14, where it is determined whether a track advance command (an instruction to advance to the next track) has been input. In the absence of such a command, the system determines whether the start key has been actuated (Step S19), and if not, the flow returns to Step S12. Once a start key actuation is detected in Step S19, the flow proceeds to Step S20 and the head advances to the next track after a fixed period of time has elapsed.

If, in Step S14, a track advance command is detected, the system also advances to the next track in Step S15, and then checks in Step S16 to determine whether any data on recording content for the new track have already been stored in the memory in system control circuit 36. If there are no such data, the system discriminates the contents of the track by reproducing those contents (Step S17), and then reproduces the image only, muting all other signals and providing a display on display unit 40 to indicate that signal muting is being performed (Step S18). If track content data are present, the flow proceeds directly to Step S18, after which the system returns to Step S12.

After a track advance in Step S20, the system determines whether track data are present (Step S21). In the event that there are no such data, the system discriminates the data recorded in the track by reproducing those data (S22). Then (or immediately after Step S21, if such track data are present in Step S21), the image alone is reproduced (Step S23), the other signals being muted, and a display being provided to indicate that muting is being performed. If, during the playback of the video, the stop key or pause key is actuated (as discriminated in Step S24), or in the absence of any subsequent track advance command (Step S25), the flow returns to Step S12 (in response to a stop key or pause key actuation) or to Step S20, respectively. In the latter case, the system advances the head to the next track after a set time interval has passed.

In the event that a track advance command is detected in Step S25, the presence or absence of track data in the new track is determined (Step S26), and the data are discriminated (Step S27) if no such track data are found. Thereafter, the image only is reproduced (Step S28), the other signals again being muted and a display being provided to indicate the muting. After display of the video signals, the flow returns to Step S20.

As explained above, if an "audio off" command is input during the prescan, the prescan can be terminated and just the video image signals played back.

Figure 4:
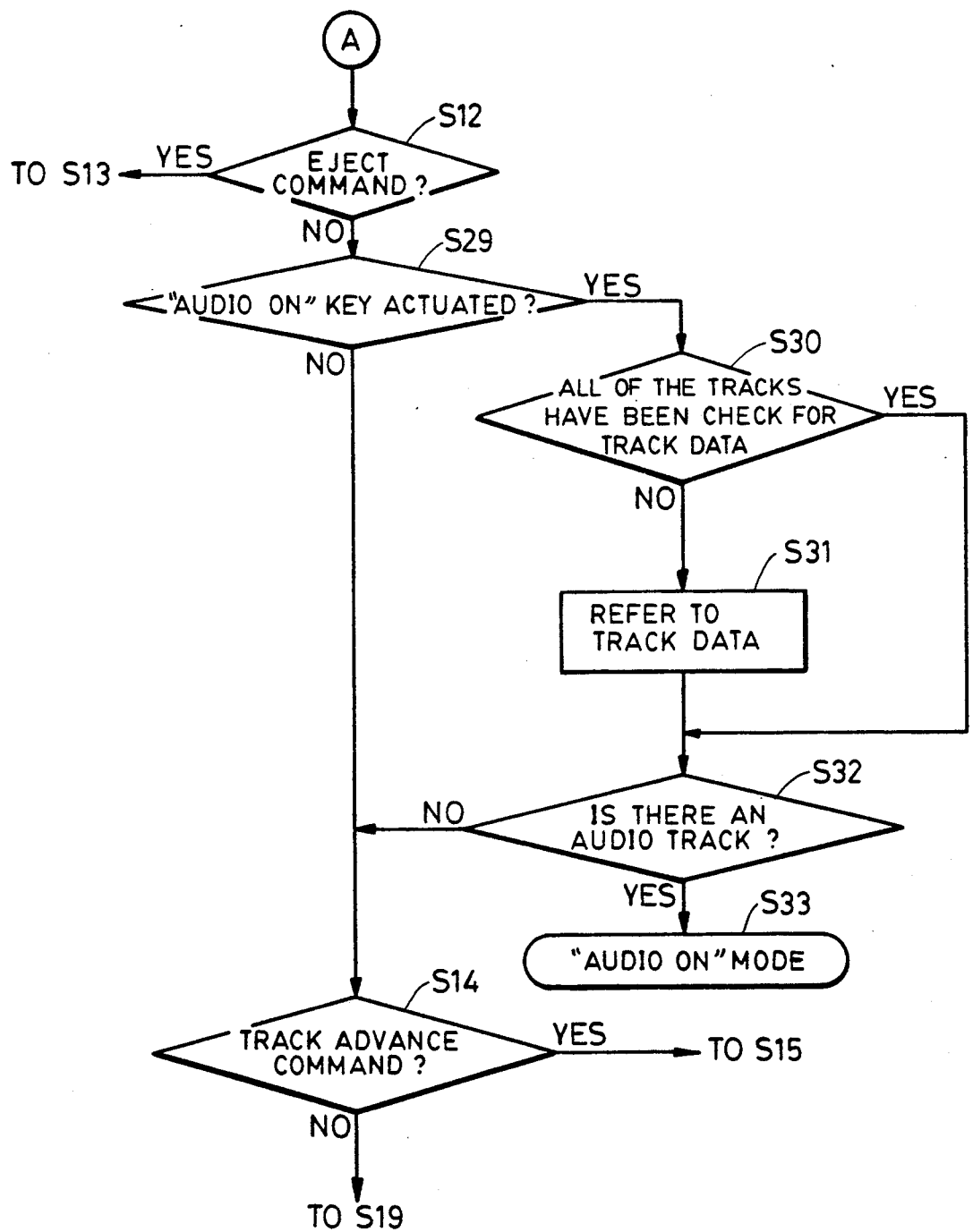
FIG. 4 is a portion of a flow chart illustrating an alternative operation of the embodiment of FIGS. 1A and 1B.
Figure 5:
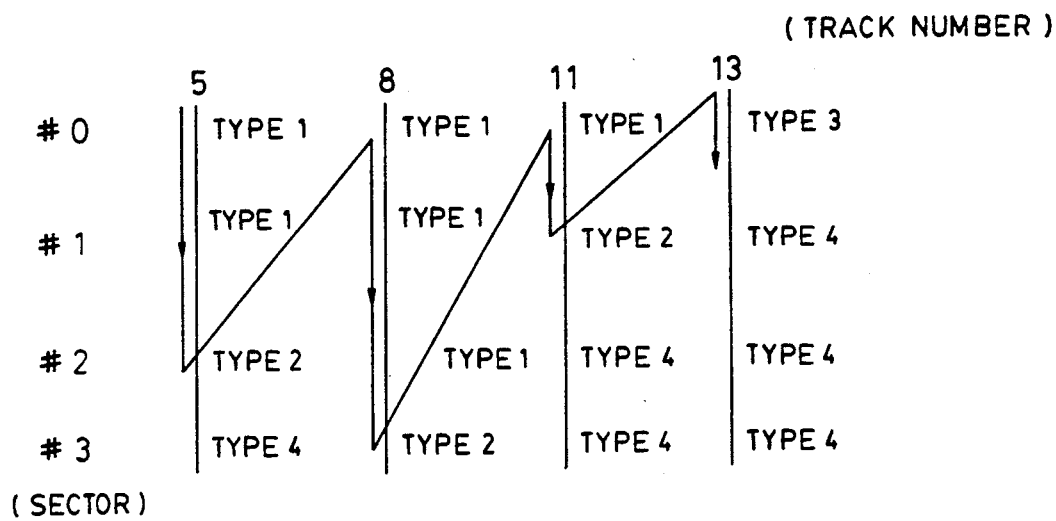
FIG. 5 is a diagram showing portions of four recording tracks on a recording medium, illustrating the four different types of recording formats.
Figure 6:
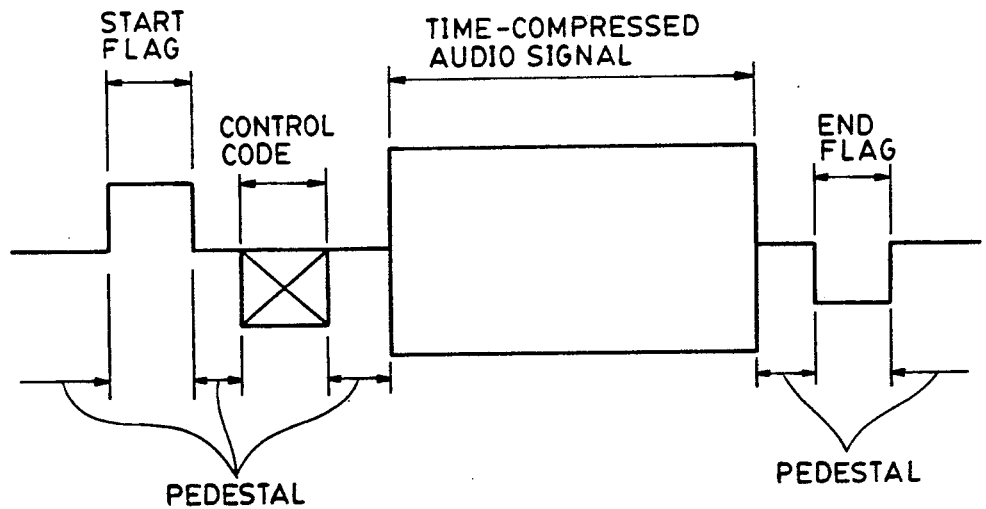
FIG. 6 is an illustration of a time-compressed audio signal format for use in the present invention, showing the presence of start and end flags and of a control code.

In the above-described embodiment, once the audio-off mode has been entered, unless the floppy is ejected, it is not possible to change back to the audio playback mode. FIG. 4 is a flow chart showing another manner of operation in which, in contrast, change to the audio playback mode from audio-off mode is possible even if the floppy is not ejected. FIG. 4 shows only the portions of the flow which differ from what is shown in FIGS. 2 and 3.

In the embodiment of FIG. 4, between the check for an eject command in Step S12 and the check for a track advance command in Step S14, a check is made (Step S29) for actuation of a "Audio On" or "Audio Mode" key. If such actuation is detected in Step S29, the system determines whether all of the tracks have been checked for track data (Step S30) and, if there is not sufficient data for all of the tracks, the actual data in the tracks is checked (Step S31). If an audio track is present, as determined in Step S32, the system enters the audio-on mode (Step S33), while if there are no audio tracks, the flow advances to Step S14, from which the operational flow is as described as above.

In the above-described embodiments, once the prescan has been initiated, it is possible to terminate the prescan, but of course it is also possible to structure the system such that upon the beginning of the supply of electrical power to the apparatus, the system immediately enters the audio-off mode and does not perform a prescan at all.

It should also be understood that the invention is applicable not only to systems for use with recording media where the auxiliary information added to the image information is audio signals, but can also be applied, for example, to systems for use with recording media having character signals or code signals as the auxiliary information.

As can be seen from the foregoing explanation, with an apparatus constructed according to the present invention, it is possible selectively to do without the prescan, and thus, in the case of a recording medium on which only image information is recorded, one can greatly reduce the necessary waiting time (dead time).

While the present invention has been described in detail with reference to the preferred embodiments, those skilled in the art will be able, from a careful consideration of the description provided, to provide many variations and modifications thereof. Such modifications and variations are to be understood as being within the scope of the invention, even though not explicitly set out herein, and that scope is to be understood as limited, not by any details set forth herein, but only by the terms of the appended claims.

What is claimed is:

1. An information reproduction apparatus for reproduction of information from a recording medium provided with at least video information thereon, said apparatus comprising:
    reading means for reading information from the recording medium;
    a prescanner for performing a prescan of the recording medium to obtain information relating to contents recorded on the recording medium; and
    interrupting means for interrupting operation of said prescanner during prescanning, and for starting reproduction of the video information from the recording medium, using said reading means.

2. The reproducing apparatus of claim 1, wherein the recording medium is provided with auxiliary information including at least one of audio signal information, code information and character information.

3. The reproduction apparatus of claim 1, further comprising a control circuit for controlling the operations of at least said reading means, said prescanner and said interrupting means.

4. The reproduction apparatus of claim 3, further comprising an insertion detector for detecting insertion of a recording medium into said apparatus, wherein said insertion detector generates a detection signal and supplies the detection signal to said control circuit upon detection of insertion of the recording medium, and said control circuit initiates a prescan operation of said prescanner in response to the detection signal.

5. The reproduction apparatus of claim 1, further comprising a control circuit, said control circuit comprising said interrupting means, and wherein, after completion of prescan by said prescanner, said control circuit enters and audio-off mode responsive to detection that there is no audio track on the recording medium.

6. The reproduction apparatus of claim 1, wherein said interrupting means is manually actuatable by an operator.

7. A reproduction apparatus according to claim 1, wherein said recording medium is of a disc shape.

8. A prescan system for a reproducing apparatus for reproducing information from a recording medium having video information recorded thereon, said prescan system comprising:
    a prescanner for performing a prescan of the recording medium, to obtain information relating to contents of what is recorded on the recording medium; and
    interrupting means for interrupting operation of said prescanner, wherein said interrupting means is manually actuable by an operator.

9. The prescan system of claim 8, wherein the recording medium is provided with auxiliary information including at least one of audio signal information, code information and character information.

10. The prescan system of claim 8, further comprising a control circuit, said control circuit comprising said interrupting means, and wherein, after completion of prescan by said prescanner, said control circuit enters and audio-off mode responsive to detection that there is not audio track on the recording medium.

11. A prescan system according to claim 8, wherein said recording medium is of a disc shape.

12. A reproducing apparatus for reproducing information from a recording medium having video information recorded thereon, said apparatus comprising:
    a prescanner for performing a prescan of the recording medium, to obtain information relating to contents of what is recorded on the recording medium;
    interrupting means for interrupting operation of said prescanner, said interrupting means being manually actuatable by an operator; and reproducing means for reproducing information from the recording medium in accordance with the prescan of said prescanner.

13. A reproducing apparatus according to claim 12, wherein the recording medium is provided with auxiliary information including at least one of audio signal information, code information and character information.

14. A reproducing apparatus according to claim 12, further comprising restarting means for restarting the prescan operation of said prescanner interrupted by said interrupting means.

15. A reproducing apparatus according to claim 14, wherein said restarting means is manually actuatable by an operator.

16. A reproducing apparatus according to claim 12, wherein said recording medium is of a disc shape.

* * * * *

UNITED STATES PATENT AND TRADEMARK OFFICE
CERTIFICATE OF CORRECTION

PATENT NO. : 5,128,774
DATED : July 7, 1992
INVENTOR(S) : Makoto Takayama

It is certified that error appears in the above-identified patent and that said Letters Patent is hereby corrected as shown below:

COLUMN 3

Line 24, "head 26," should read --head 24,--.

COLUMN 6

Line 8, "reproducing" should read --reproduction--;
    Line 29, "and" should read --an--;
    Line 46, "actuable" should read --actuatable--;
    Line 56, "and" should read --an--; and
    Line 57, "not" should read --no--.

Signed and Sealed this

Twenty-fourth Day of August, 1993

Attest:

BRUCE LEHMAN

Attesting Officer    Commissioner of Patents and Trademarks